United States Patent [19]

Blanpain et al.

[11] Patent Number: 5,074,697

[45] Date of Patent: Dec. 24, 1991

[54] RELEASABLE CONNECTOR FOR INTERCONNECTING TWO PARTS SUBJECTED TO HIGH STRESSES

[75] Inventors: Guy Blanpain, Mouzay; Gilles De Braeckelaer, Paris; Jean-Francois Bonniec, Le Mee/Seine, all of France

[73] Assignee: Societe Europeenne de Propulsion, Suresnes, France

[21] Appl. No.: 447,809

[22] Filed: Dec. 8, 1989

[30] Foreign Application Priority Data

Dec. 14, 1988 [FR] France .................... 88 16472

[51] Int. Cl.⁵ ............................................. F16G 11/02
[52] U.S. Cl. ................................... 403/28; 403/50; 403/41; 403/336; 285/354; 285/386
[58] Field of Search ............... 403/41, 50, 223–224, 403/203, 336, 28, 30; 285/224, 225, 226, 229, 354, 386

[56] References Cited

U.S. PATENT DOCUMENTS

| | | | |
|---|---|---|---|
| 2,868,576 | 1/1959 | Boughton | 403/336 X |
| 3,418,010 | 12/1968 | Buckner | 285/354 X |
| 3,488,072 | 1/1970 | Allen et al. | 285/354 X |
| 3,499,671 | 3/1970 | Osborne | 285/354 X |
| 3,764,169 | 10/1973 | St. Clair | 285/354 X |
| 3,891,246 | 6/1975 | Hopper | 285/354 X |
| 3,929,358 | 12/1975 | Eckhardt . | |
| 4,116,477 | 9/1978 | Wahoski | 285/386 X |
| 4,186,949 | 2/1980 | Bartha et al. | 285/226 |
| 4,283,078 | 8/1981 | Ross et al. | 285/229 X |
| 4,540,205 | 9/1985 | Watanabe et al. | 285/354 X |
| 4,570,981 | 2/1986 | Fournier et al. | 285/354 X |
| 4,586,735 | 5/1986 | Innes | 285/354 |
| 4,605,248 | 8/1986 | Goldsmith et al. | 285/354 X |
| 4,861,076 | 8/1989 | Newman et al. | 285/354 CX |

FOREIGN PATENT DOCUMENTS

| | | | |
|---|---|---|---|
| 2618319 | 11/1977 | Fed. Rep. of Germany | 403/223 |
| 2234507 | 6/1974 | France . | |
| 2481761 | 4/1981 | France . | |
| 2577632 | 8/1986 | France . | |
| 372933 | 7/1976 | U.S.S.R. | 403/223 |
| 2052665 | 1/1981 | United Kingdom | 285/224 |

Primary Examiner—Peter M. Cuomo
Assistant Examiner—Heather Chun
Attorney, Agent, or Firm—Poms, Smith, Lande & Rose

[57] ABSTRACT

A releasable connector for interconnecting a first part and a second part, at least one of the parts being subjected to high stresses in particular of vibratory origin and of thermal origin, the connector comprising a sealing ring compressed between the two parts, a main lip formed on the first part to be interconnected, and at least one connection part for exerting a retaining action on the main lip relative to the second part to be interconnected and for compressing the sealing ring. The connector further includes an intermediate ring provided with a flange and constituted by at least two lengths, the intermediate ring being interposed between the main lip and the connection part and being made of a material of low thermal conductivity. The connection part has a thin wall provided in the form of a bellows for adjusting the elasticity of the connection and the thermal barrier constituted by the connection, the thin wall being situated between a first fixing portion for fixing on the second part and a cylindrical second portion having an inside diameter greater than the outside diameter of the main lip. The flange of the intermediate ring bears against the cylindrical second portion of the connection part.

11 Claims, 3 Drawing Sheets ct
RELEASABLE CONNECTOR FOR INTERCONNECTING TWO PARTS SUBJECTED TO HIGH STRESSES The present invention provides a releasable connector for interconnecting a first part and a second part, at least one of the parts being subjected to high stresses in particular of vibratory origin and of thermal origin, the connector comprising a sealing ring compressed between the two parts, a main lip formed on the first part to be interconnected, and at least one connection part for exerting a retaining action on said main lip relative to the second part to be assembled and for compressing the sealing ring.

BACKGROUND OF THE INVENTION

The way a connection is made between two items, e.g. tubular items, depends on the nature of the materials to be interconnected, on the substance conveyed by said items, on the dimensions of the items, and also on the stresses exerted on the connection and/or on the items to be interconnected, and finally on the facilities to be provided. A very large number of connectors are therefore already in existence, each satisfying one or more well-defined technical problems.

The present invention relates to a connector for interconnecting two parts, with at least one of the two parts being subjected to high stresses, essentially of vibratory origin and of thermal origin, which part(s) should not be subjected to additional mechanical stresses by the connection.

For example, French patent document FR-A-2 481 761 describes a thermal barrier between a high pressure and high temperature centrifugal pump and its motor.

The thermal barrier disclosed in this document is constituted by two cheeks clamped against a thermally insulating gasket, with the assembly being held in place by ties running parallel to the axis of the motor.

This type of device acts as a barrier to heat flow, but it does not constitute a universal connection enabling a first part to be connected to a second part without requiring either of the parts to be drilled.

French patent document FR-A-2 234 507 discloses a screwed connection in which a sealing ring is compressed between two flanges by means of a clamping device comprising a ring and collars in several portions.

Such a connection is suitable for tubes enamelled on the inside, which are small in size and which are subjected to low stresses. However it does not confer thermal barrier qualities on the connection, nor does it limit the mechanical stresses that may appear in each of the portions of the connection because of vibration or because of differential expansion.

The object of the present invention is to mitigate the above-mentioned drawbacks by providing a releasable connector which is easily installed and which guarantees a reliable and leakproof connection between two parts, at least one of which is subjected to high stresses, and in particular thermal stresses, while limiting the mechanical stresses imparted on the two parts.

SUMMARY OF THE INVENTION

These objects are achieved by a releasable connector of the type mentioned at the beginning of the description and further including an intermediate ring provided with a flange and comprised of at least two sections, said intermediate ring being interposed between said main lip and said connection part and being made of a material of low thermal conductivity; in which the connection part has a thin wall providing a controlled amount of elasticity to the connection as well as a thermal barrier between said first and second interconnected parts, said thin wall being situated between a first fixing portion for fixing on said second part and a cylindrical second portion having an inside diameter greater than the outside diameter of the main lip; and in which the flange of said intermediate ring bears against said cylindrical second portion of said connection part.

In a particular embodiment of the invention, the first portion of the intermediate connection part connected to the second part to be assembled is constituted by a nut cooperating with a thread on the second part.

In another embodiment of the invention, the connection part comprises a fixing ring having a first portion bolted to the second part to be assembled and provided with a thin annular portion in which a plurality of radial slots are formed, and a profiled sleeve having a thin wall and an inside diameter greater than the outside diameter of the main lip and including bearing zones for bearing against the radially innermost tips of said thin annular portion and for bearing against said flange of said intermediate ring.

In yet another embodiment of the invention, the connection part is a one-piece part constituted by a first fixing ring bolted to the second part to be assembled and by a thin wall having an inside diameter greater than the outside diameter of the main lip and provided with slots oriented transversely relative to the axis of the connection.

At the contact surface between the ring and the first part to be assembled, the first part is preferably inclined relative to the connection axis. However, contact could also be provided between two different faces: one of them being cylindrical in order to center the items constituting the connection, and the other being annular and perpendicular to the first and lying in a plane extending transversely to the connection axis in order to transmit forces between the parts to be assembled.

The thin wall of the connection part may be of different shapes, and may bulge outwardly from the cylindrical connection, or it may be in the form of a bellows.

In an important application of the invention, the connector is used for mounting a combustion chamber made of composite material on a support therefor, without requiring any drilling or welding. In this application, the heat barrier function and the elasticity function specific to the invention are particularly advantageous. The thermal isolation achieved in this way limits the flow of heat from the hot portions of an engine (combustion chamber) to the cold portions thereof (injector, valves, . . . ). In addition, the intrinsic elasticity of the inventive connector allows it to maintain the same connection and sealing performance during thermal expansion of the materials concerned.

BRIEF DESCRIPTION OF THE DRAWINGS

Embodiments of the invention are described by way of example with reference to the accompanying drawings, in which.

DETAILED DESCRIPTION

Figure 1:
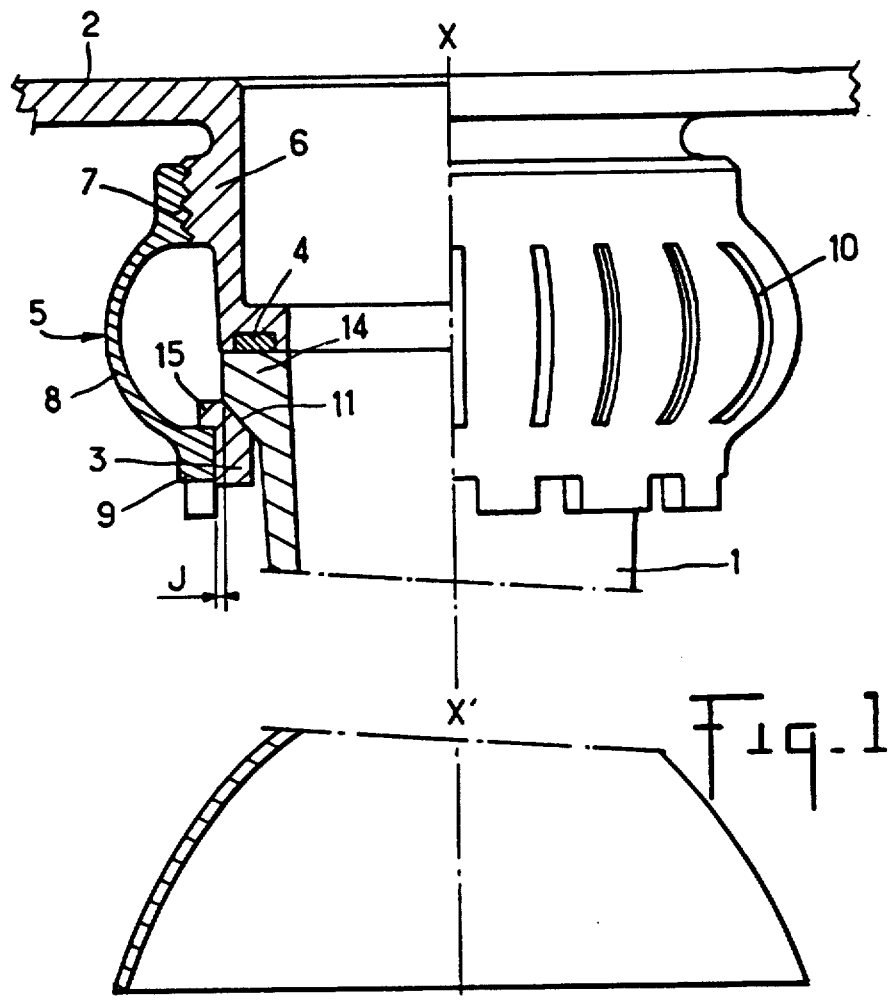
FIG. 1 is an elevation view and a longitudinal half section through a first embodiment of the connector of the invention used for making a connection between a combustion chamber and its support.

In a first embodiment as shown in FIG. 1, the connector of the invention provides a connection between a first part 1, e.g. a combustion chamber made of composite materials, and a second part 2, e.g. a support for the combustion chamber 1. The connector comprises an intermediate ring 3, a sealing ring 4, and a connection part 5 comprising a first portion 7 in the form of a nut attached to a thin wall 8 which is terminated by a second portion 9 that bears against a flange 15 on the intermediate ring 3.

At a suitable distance from the connection, the first part to be assembled 1 may be arbitrary in shape, e.g. flared if it is a combustion chamber. At the connection, it will be readily understood that the two parts to be assembled 1 and 2 have contact surfaces which are directly superposable. The second part to be assembled 2, and which constitutes a support for the chamber 1 in this example, is provided with a circumferential groove used for receiving the sealing ring 4. This part 2 is also provided with an outside thread 6 for co-operating with the terminal portion 7 in the form of a nut on the connection part 5. The threaded portion 7 of the part 5 acts as a limit for a thin wall 8 which may bulge outwardly, for example, and which is advantageously provided with longitudinal slots 10 contributing to imparting elasticity thereto and to reducing heat transfer. The base or lip 9 of the part 5 serves as a bearing surface for the ring 3. The inside diameter of the base 9 is slightly greater than the outside diameter of the lip 14 formed on the free end of the part 1 for retaining the intermediate ring 3. Clearance j is thus provided to enable the base 9 of the part 5 to be threaded over the first part 1 during assembly. When the part 1 is constituted by a combustion chamber of a rocket engine, it is particularly advantageous to be able to insert the connector via the end of the chamber constituted by the lip 14.

Figure 7:
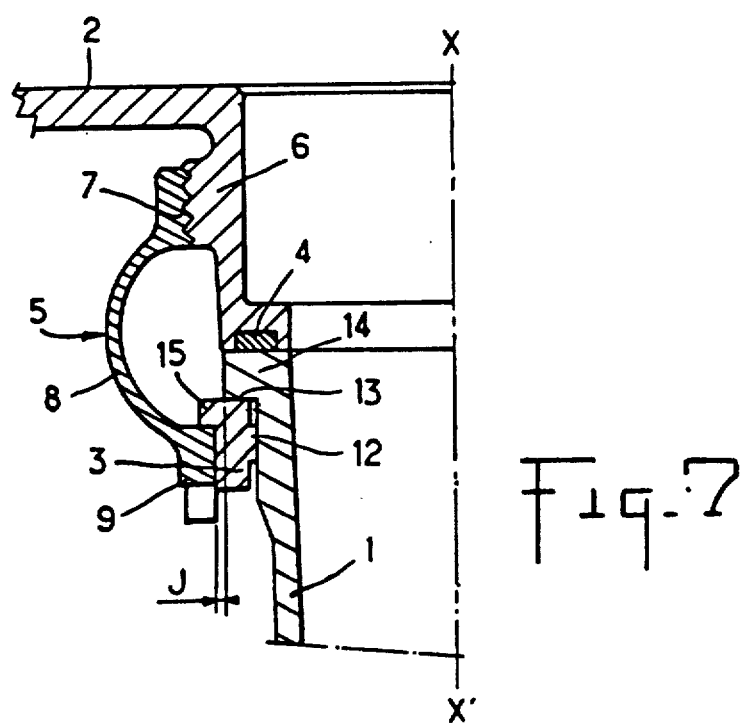
FIG. 7 is a longitudinal half-section through a connector similar to the first embodiment shown in FIG. 1 but in which the intermediate ring has two surfaces making contact with the combustion chamber.

The intermediate ring 3 has the special feature of being constituted by a plurality of sections so as to be capable of being put into place beneath the lip 14 after the connection part 5 has been engaged around the part 1 with its base 9 beneath the lip 14. While the nut 7 is being tightened, the ring 3 is inserted between the base 9 of the connection part 5 and one or more contact surfaces formed at the terminal portion of the first part to be assembled 1. In FIG. 1, the contact surface 11 is inclined relative to the vertical (or the connection axis XX'). In FIG. 7, which differs from FIG. 1 solely in the nature of the contact, contact is provided by two surfaces: a first surface 12 is cylindrical, whereas a second surface 13 is annular, and occupies a plane extending transversely to the connection axis XX'. This variant serves to separate the bearing surface function for transmitting connection forces as provided by the second surface 13 and the centering function as provided by the first surface 12. In all cases, the ring 3 is made of a refractory material and thus contributes to the thermal isolation of the connection.

Figure 2:
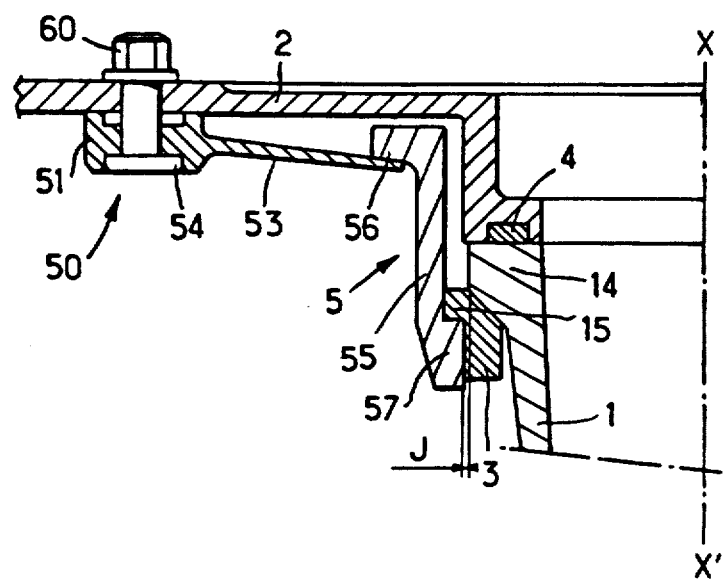
FIG. 2 is a longitudinal half section through a second embodiment of a connector in accordance with the invention.
Figure 3:
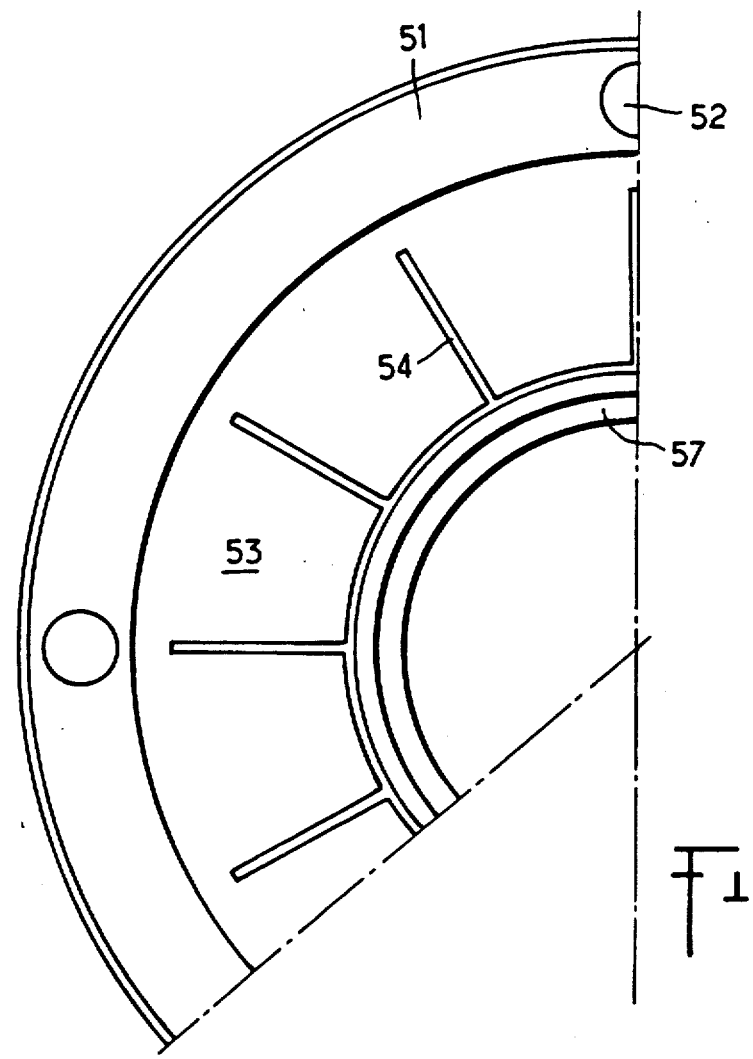
FIG. 3 is a fragmentary view of a portion of the FIG. 2 connection as seen from below.

FIGS. 2 and 3 show a second embodiment of a connector of the invention in which the connection part 5 differs from that of the first embodiment. In this case it is constituted by two portions: the first portion 50 is constituted by a clamping ring which is removably mounted on the second part 2 to be assembled by means of bolts 60, and the second portion 55 is a profiled sleeve. More precisely, the first portion 50 is in the form of a flat part comprising a ring 51 of increased thickness provided with openings 52 for boltint to the second part 2 of the connection, and extending inwardly in the form of an inner ring 53 provided with radial slots 54 that open out inwardly. The second portion 55 of the connection part 5 has a top flange 56 which is cantilevered over the tips of the inner ring 51. Forces are transmitted via the cylindrical body 55 of the sleeve (which may be made of ceramic or of refractory material) down to an inwardly-directed bottom flange 57 which bears against the outwardly directed flange 15 of the ring 3. Since the other components of this second embodiment are identical to those of the first embodiment described above, they are not described in further detail here. It should be observed that the elasticity in this second connection is obtained by the reduced-thickness portion of the fixing ring 53 which is in the form of a radially split disk. The flexibility of this part can be adjusted by varying its area, its thickness, and the number of its slots, and also by varying the material from which it is made.

Figure 4:
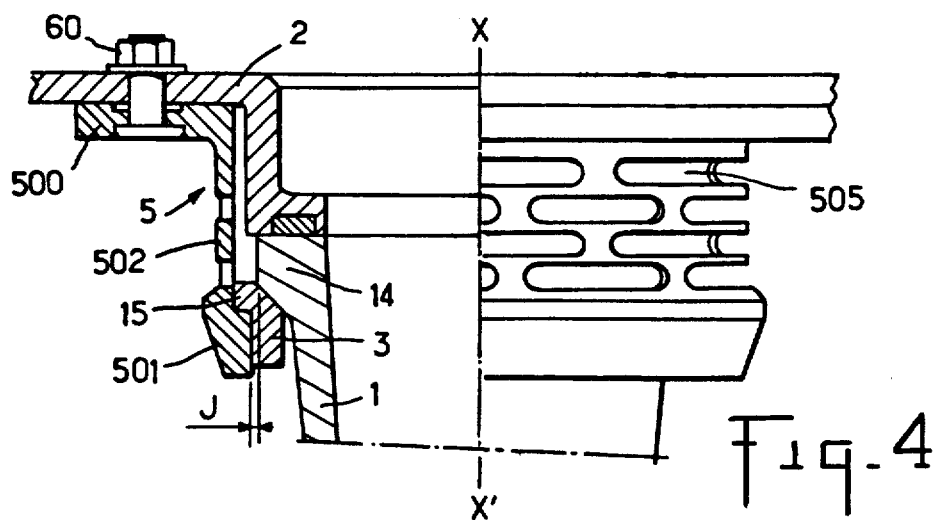
FIG. 4 is an elevation and a longitudinal half-section through a third embodiment of a connector of the invention.
Figure 5:
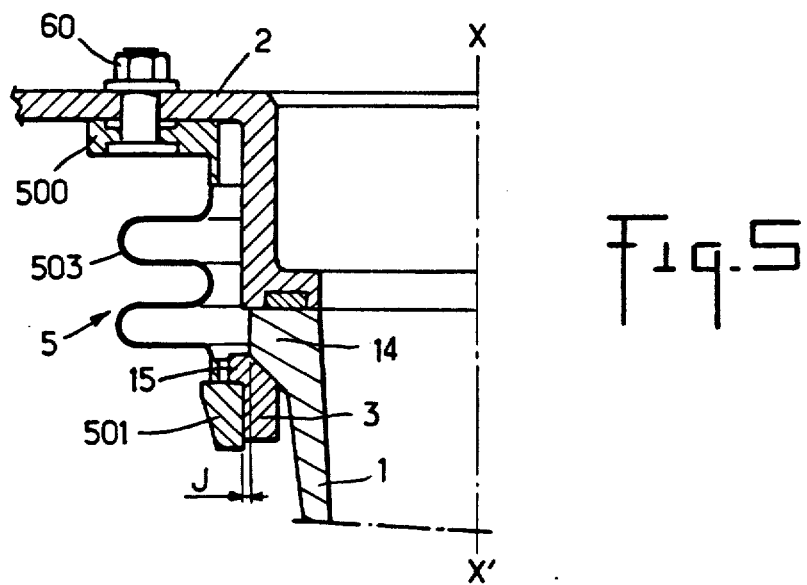
FIG. 5 is a longitudinal half-section through a fourth embodiment of a connector of the invention.
Figure 6:
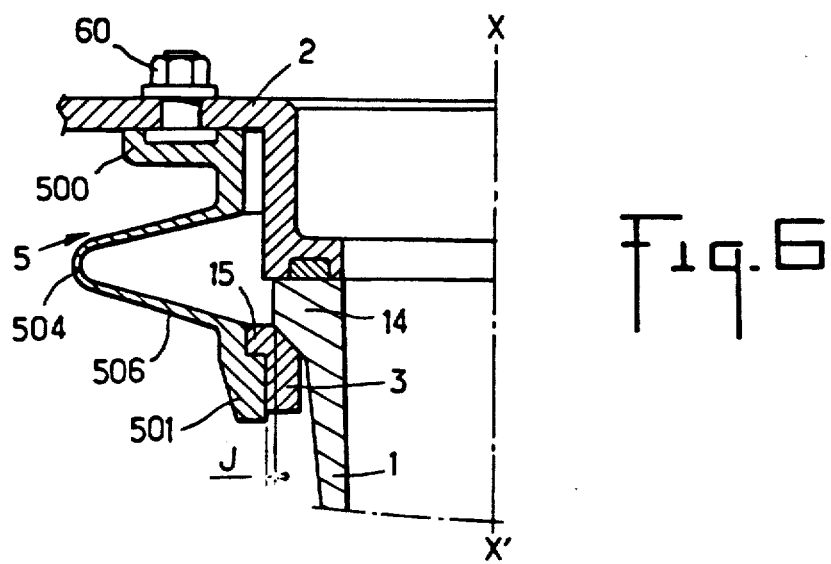
FIG. 6 is a longitudinal half-section through a fifth embodiment of a connector of the invention.

FIGS. 4, 5, and 6 show three other possible embodiments of the invention in which the connection part 5 is a single part (but not screwed on as in the first embodiment shown in FIGS. 1 and 7), constituted by a fixing ring 500 held in place, e.g. by bolts 60 on the second part 2 to be assembled, and by a base 501 bearing against the flange 15 of the ring 3, with the base 501 and the fixing ring 500 being interconnected by a thin wall 502, 503, or 504 provided with slots 505 or 506 whose axes extend transversely relative to the axis XX' of the connection.

The various embodiments of FIGS. 4 to 6 differ in the shape of said thin wall: the embodiment shown in FIG. 4 has a thin wall 502 which is cylindrical. In FIG. 5, the thin wall 503 is in the form of a bellows, whereas in FIG. 6 the thin wall 504 is in the form of a V-shape lying on its side.

In the embodiments of FIGS. 4 to 6, the inside diameter of the part 5 is not less than the outside diameter of the lip 14 on the part 1, so as to leave sufficient clearance between the connection part 5 and the first part 1 to allow the connection part 5 to be placed around the lip 14, with the part 1 being locked relative to the connection part 5 by the intermediate ring 3.

In all of the above-described embodiments, the connection part 5 provides two characteristic functions simultaneously:

The first function is an elasticity function, obtained by the particular shape of the connection part 5 which has a thin wall which is flexible and which is provided with slots. The flexibility of this wall may be adjusted by its shape, its thickness, the number and orientation of its slots, and also by the material from which it is made.

By using an elastic connection part, it is possible to absorb thermal expansion and to keep the connection performance and the sealing performance of the connector constant.

The second function of the part 5 is a thermal isolation function and this is due to its thinness and to the cross-section of this wall which provide high thermal resistance and which allow a large amount of heat to be interchanged with the surrounding medium. The intermediate ring 3, which is built up from a plurality of sections is preferably constituted by a refractory material, thereby also participating in the thermal isolation provided by the connection.

When the first part 1 is a combustion chamber made of composite material and the second part 2 is constituted by a support for said chamber, the connector of the present invention avoids any need to drill or weld the combustion chamber, and allows assembly to be provided via the foot of the chamber situated facing the support. This is achieved by means of the ring 3 which is constituted by a plurality of sections, and by means of the connection part 5 whose inside diameter is slightly greater than the outside diameter of the parts 1 and 2 to be assembled.

Finally, the connection is sealed by a sealing ring 4 which is directly compressed between the parts 1 and 2 to be assembled.

In addition, the intermediate ring 3 made up of a plurality of sections serves to provide a good distribution of forces on the first part to be assembled 1.

We claim:

1. A releasable connector for interconnecting a first part and a second part, at least one of the parts being subjected to high stresses in particular of vibratory origin and of thermal origin, the connector comprising a sealing ring compressed between the two parts, a main lip formed on the first part to be interconnected, and at least one connection part for exerting a retaining action on said main lip relative to the second part to be assemble and for compressing the sealing ring, wherein the connector further comprises an intermediate ring provided with a flange and constituted by at least two sections, said intermediate ring being interposed between said main lip and said connection part and being made of a material of low thermal conductivity; wherein the connection part has a thin wall providing a controlled amount of elasticity to the connection as well as a thermal barrier between said first and second interconnected parts, said thin wall being situated between a first fixing portion for fixing on said second part and a cylindrical second portion having an inside diameter greater than the outside diameter of the main lip; and wherein the flange of said intermediate ring bears against said cylindrical second portion of said connection part.

2. A connector according to claim 1, wherein the first portion of the intermediate connection part connected to the second part to be assembled is constituted by a nut co-operating with a thread on the second part.

3. A connector according to claim 1, wherein the connection part includes a fixing ring having a first portion bolted to the second part to be assembled and provided with a thin annular portion in which a plurality of radial slots are formed, and a profiled sleeve having a thin wall and an inside diameter greater than the outside diameter of the main lip and including bearing zones for bearing against the radially innermost tips of said thin annular portion and for bearing against said flange of said intermediate ring.

4. A connector according to claim 3, wherein the profiled sleeve is made of a ceramic or refractory material.

5. A connector according to claim 1, wherein the connection part is a one-piece part constituted by a first fixing ring bolted to the second part to be assembled and by a thin wall having an inside diameter greater than the outside diameter of the main lip and provided with slots oriented transversely relative to the axis of the connection.

6. A connector according to claim 1, wherein said thin wall bulges outwardly from the connection.

7. A connector according to claim 1, wherein said thin wall is cylindrical.

8. A connector according to claim 1, wherein said thin wall is in the form of a bellows.

9. A connector according to claim 1, wherein the contact surface between the first part to be assembled and the intermediate ring is inclined relative to the connection axis.

10. A connector according to claim 1, wherein the contact surface between the first part to be assembled and the intermediate ring is formed by a cylindrical surface for centering the connection components, and by an annular surface for transmitting forces between the parts to be assembled.

11. A connector according to claim 1, wherein the first part is constituted by a combustion chamber made of composite material and wherein the second part is constituted by the support for said chamber, the connection made in this way being such that said composite combustion chamber is subjected neither to welding nor to drilling.

* * * * *